United States Patent
Poepperl et al.

(10) Patent No.: US 12,339,358 B2
(45) Date of Patent: Jun. 24, 2025

(54) METHOD FOR OPERATING AN ULTRASONIC SENSOR DEVICE FOR MONITORING AN UNDERBODY REGION OF A MOTOR VEHICLE, COMPUTER PROGRAM PRODUCT, COMPUTER-READABLE STORAGE MEDIUM, AND ULTRASONIC SENSOR DEVICE

(71) Applicant: Valeo Schalter und Sensoren GmbH, Bietigheim-Bissingen (DE)

(72) Inventors: Maximilian Poepperl, Kronach Neuses (DE); Felix Becker, Kronach Neuses (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 107 days.

(21) Appl. No.: 18/282,662

(22) PCT Filed: Mar. 14, 2022

(86) PCT No.: PCT/EP2022/056472
§ 371 (c)(1),
(2) Date: Sep. 18, 2023

(87) PCT Pub. No.: WO2022/194746
PCT Pub. Date: Sep. 22, 2022

(65) Prior Publication Data
US 2024/0168157 A1    May 23, 2024

(30) Foreign Application Priority Data
Mar. 18, 2021   (DE) .................... 10 2021 106 633.6

(51) Int. Cl.
*G01S 15/931* (2020.01)
*G01S 7/52* (2006.01)
(Continued)

(52) U.S. Cl.
CPC ........ *G01S 15/931* (2013.01); *G01S 7/52006* (2013.01); *G01S 7/527* (2013.01); *G01S 15/04* (2013.01); *G01S 2015/937* (2013.01)

(58) Field of Classification Search
CPC .... G01S 15/931; G01S 7/52006; G01S 7/527; G01S 15/04; G01S 2015/937; G01S 7/52004
See application file for complete search history.

(56) References Cited

FOREIGN PATENT DOCUMENTS

DE   102017208268 B3   3/2018
DE   102017111932 A1   12/2018
(Continued)

OTHER PUBLICATIONS

International Search Report and Written Opinion in corresponding International Application No. PCT/EP2022/056472, dated Jul. 11, 2022 (13 pages).
(Continued)

*Primary Examiner* — Omeed Alizada
(74) *Attorney, Agent, or Firm* — Osha Bergman Watanabe & Burton LLP (57) ABSTRACT

The invention relates to a method for operating an ultrasonic sensor device (2) for monitoring an underbody region (12) of a motor vehicle (1), wherein ultrasonic signals (U) are emitted into the underbody region (12) by means of at least one ultrasonic sensor (4, 5, 6, 7) of the ultrasonic sensor device (2), and the reflected ultrasonic signals (U) are received and analyzed. After the motor vehicle (1) is parked at a first point in time (t1), a reference measurement curve (13) for the underbody region (12) is generated on the basis
(Continued)

of at least one ultrasonic signal (U) and is stored, wherein a measurement region (18) is determined in the reference measurement curve (13) in which the monitoring process of the underbody region (12) is analyzed, and the measurement region (18) is determined on the basis of the decay time (16) of the ultrasonic sensor (4, 5, 6, 7) and a ground reflection (19) on the ground surface (11). The invention additionally relates to a computer program product, a computer-readable storage medium, and an ultrasonic sensor device (2).

14 Claims, 4 Drawing Sheets

(51) Int. Cl.
*G01S 7/527* (2006.01)
*G01S 15/04* (2006.01)

(56) References Cited

FOREIGN PATENT DOCUMENTS

| DE | 102018130914 | A1 | | 6/2020 |
|---|---|---|---|---|
| DE | 102019115133 | A1 | * | 12/2020 |
| DE | 102019125094 | A1 | | 3/2021 |
| EP | 1923716 | A1 | | 5/2008 |
| WO | 03016941 | A2 | | 2/2003 |

OTHER PUBLICATIONS

German Search Report in corresponding German Application No. 10 2021 106 633.6, dated Nov. 24, 2021 (5 pages).

* cited by examiner

METHOD FOR OPERATING AN ULTRASONIC SENSOR DEVICE FOR MONITORING AN UNDERBODY REGION OF A MOTOR VEHICLE, COMPUTER PROGRAM PRODUCT, COMPUTER-READABLE STORAGE MEDIUM, AND ULTRASONIC SENSOR DEVICE

The invention relates to a method for operating an ultrasonic sensor device for monitoring an underbody region of a motor vehicle by means of the ultrasonic sensor device of the motor vehicle, in which ultrasonic signals are emitted into the underbody region by means of at least one ultrasonic sensor device, and in which the reflected ultrasonic signals are received and evaluated by means of the ultrasonic sensor. Furthermore, the invention relates to a computer program product, a computer-readable storage medium, and an ultrasonic sensor device.

Examining or monitoring the underbody region of a motor vehicle before it drives off is a task that must be performed by the motor vehicle itself in the course of autonomous driving. In particular, objects at risk, such as children or animals, should be detected before the vehicle drives off, so that it can be prevented from driving off in order to avoid injury to such objects. Various sensor systems can be used to detect the objects. For example, cameras or lidar sensors can be used here, which due to the difficult environmental conditions can only be operated with additional precautions. Alternatively or in addition, radar sensor devices and/or ultrasonic sensor devices can also be used. In particular in the case of ultrasonic sensor devices, lateral spatial resolution can often not be implemented. As a result, multiple reflections from the underbody cannot be distinguished from relevant object reflections. In addition, this approach can also produce masking phenomena, which means, for example, that the wheels of the motor vehicle produce stronger reflections than the actual object itself and this object is then no longer detectable in the ultrasound signal.

Furthermore, in the calibration process it can be assumed in principle that the distance between a sensor and the road surface is constant, since a calibration typically only deals with the decay time and the reflections of the road surface. However, the solutions from the prior art do not allow for the fact that a loading state of the motor vehicle can change. In particular, however, the loading state can have a serious impact on the calibration. In addition, different vehicle models have different heights between the underbody and the road surface.

Document WO 03/016941 A2 discloses an echo signal monitoring device comprising a plurality of transceiver units for transmitting signals and receiving the echoes reflected from an external object, and an evaluation unit for estimating the distance between the monitoring device and the external object by means of the received echoes, wherein the device has an operating state for calculating the relative position of the transceiver units to each other based on the reflected echoes.

DE 10 2018/130914 A1 relates to a method for operating an ultrasonic sensor device, in which an ultrasonic signal is emitted into a ground region of a motor vehicle and an ultrasonic signal is received and an object is detected by means of an electronic computing device based on the received ultrasonic signal, wherein a first ultrasonic signal is received in the ground region at a first point in time and a second ultrasonic signal is received at a second point in time, and the first ultrasonic signal as a first reference curve and the second ultrasonic signal as a comparison curve are compared with each other and, based on the comparison, wherein a first threshold region is generated depending on the first amplitudes received, the object is detected when a predetermined first number of received first amplitudes of the comparison curve is detected outside the threshold region.

DE 10 2017 208 268 B3 proposes a method for determining the loading state of a vehicle and/or for determining the installation height of at least one ultrasonic sensor of the vehicle, wherein an ultrasonic sensor of the vehicle has at least one first operating mode and one second operating mode, which differs from the first operating mode in at least one operating parameter. The ultrasonic sensor is operated in the first operating mode for detecting the vehicle surroundings. This first operating mode can also be called normal operation or measurement operation. The ultrasonic sensor is operated in the second operating mode to determine the loading state of the vehicle and/or to determine the installation height. It is provided that in the second operating mode the ultrasonic sensor is controlled in such a way that the ultrasonic sensor has an increased sound radiation towards the road, that is, the ground on which the vehicle stands, in comparison to the first operating mode. To determine the loading state of the vehicle and/or to determine the installation height, echo signals reflected from the road surface, so-called ground echoes, of the ultrasonic signals emitted by the ultrasonic sensor are evaluated.

The object of the present invention is to provide a method, a computer program product, a computer-readable storage medium, and an ultrasonic sensor device, by means of which a more reliable monitoring of an underbody region of a motor vehicle can be carried out.

This object is achieved by a method, a computer program product, a computer-readable storage medium, and an ultrasonic sensor device according to the independent patent claims. Advantageous forms of embodiment are specified in the dependent claims.

One aspect of the invention relates to a method for monitoring an underbody region of a motor vehicle by means of an ultrasonic sensor device of the motor vehicle. Ultrasonic signals are emitted into the ground region by means of at least one ultrasonic sensor of the ultrasonic sensor device, and the reflected ultrasonic signals are received and evaluated by means of the ultrasonic sensor. After the motor vehicle is parked at a first point in time, a reference measurement curve for the underbody region is generated as a function of at least one ultrasonic signal and stored.

It is provided that a measurement region is determined in the reference measurement curve, in which region the monitoring process of the underbody region is evaluated, wherein the measurement region is determined on the basis of a decay time of the ultrasonic sensor and a ground reflection on the ground surface.

This allows for more reliable monitoring of a underbody region of a motor vehicle.

In particular, the measurement region is defined between the underbody of the motor vehicle and the ground region, in particular between the decay time and the ground reflection. This measurement region can be reliably determined by taking into account the decay time and the ground reflection, which allows improved monitoring of the underbody region to be carried out. Within this measurement region, it will then be possible to search for objects.

In an advantageous form of embodiment, after a restart of the motor vehicle, at a second point in time later than the first point in time a comparison measurement curve is generated as a function of at least one further ultrasonic signal and the reference measurement curve is compared with the comparison measurement curve in the measurement region and, based on the comparison, the monitoring of the underbody region is carried out by means of an electronic computing device of the ultrasonic sensor device.

In a convenient form of embodiment, based on the comparison, a change in height between an underbody of the motor vehicle and a ground surface in the underbody region is determined, and the change in height is taken into account in the evaluation and monitoring, wherein the change in height between the first point in time and the second point in time is determined.

This makes it possible to reliably monitor the underbody region of the motor vehicle. The underbody region is understood in particular to mean the region which is formed between a road surface, on which the motor vehicle is located, and a ground region of the motor vehicle. The proposed method creates the possibility of using the ultrasonic sensor device in different vehicle models, under different load conditions and also after bodywork modifications. This results in a higher flexibility of the ultrasonic sensor device both for fully autonomous operation, for example in a so-called valet parking procedure, but also in assisted operation, in which the loading is strongly affected by the vehicle occupants, inter alia.

In particular, the invention therefore uses the fact that when the motor vehicle is parked, it can be assumed that there are no objects located in the underbody region. For this purpose, the reference measurement curve is generated after the motor vehicle has been parked, and is thus generated without objects. A height of the underbody of the motor vehicle relative to the road surface can be determined as part of this. When the motor vehicle is restarted, an ultrasound signal is emitted again and the comparison measurement curve is generated. If there is now an object located in the underbody region, this can be detected by means of the comparison. In addition, a further height can now be determined, which can result, for example, from a change in the loading state of the motor vehicle compared to the first point in time. This change in height is then taken into account when searching for objects in the underbody region.

According to one advantageous form of embodiment, a ground reflection of the ground surface is determined in the reflected ultrasonic signal of the reference measurement curve and a first height relative to the ground surface is determined on the basis of the determined ground reflection at the first point in time. In the further reflected ultrasonic signal of the comparison measurement curve, a ground reflection of the ground surface is determined and a second height relative to the ground surface is determined on the basis of the determined ground reflection at the second point in time. The change in height is determined by comparing the first and second heights. In particular, the ground clearance for the ultrasonic sensor is thus determined. To do this, a measurement signal from the ultrasonic sensor is recorded. When the motor vehicle is parked, it can be assumed that there are no objects in the critical regions, so that the first maximum in the ultrasonic signal can be assigned to the road surface. In addition to this reflection, the duration of the decay time can be determined. From these two points, the region for evaluating signals for the underbody detection can now be determined adaptively. In addition, further parameters can be derived from these two points and their amplitudes. In particular, by determining the first height during the first point in time and by determining the second height during the second point in time, for example, a change in the loading state can be reliably detected. This allows the method to be made robust against loading conditions, so that reliable monitoring of the underbody region can be realized.

It is also advantageous if a decay time of the ultrasonic sensor is taken into account when determining the height change. In particular in the region of the decay time, which means that an acoustic transducer of the ultrasonic sensor device is still vibrating and is therefore not suitable for receiving signals, no object detection can be carried out, which is now taken into account. In particular, the ultrasonic sensor is therefore essentially "deaf" during the decay time. By taking this deafness into account, reliable monitoring of the underbody of the motor vehicle can be realized.

It has also proved advantageous if at least one first environmental condition is detected when generating the reference measurement curve and/or at least one second environmental condition is detected when generating the comparison measurement curve and the first environmental condition and the second environmental condition are taken into account when determining the change in height. In particular, environmental conditions have a significant influence on the ultrasound signals. For example, environmental conditions such as temperature or air humidity can have a significant influence on the corresponding measurement curves. By taking these environmental conditions into account, the change in height can now be better determined and the object detection can be improved. This means that monitoring of the underbody region can be implemented reliably.

In a further advantageous form of embodiment, the ultrasonic signal is emitted by the at least one ultrasonic sensor into a region behind one wheel of the motor vehicle. In particular, the motor vehicle can have a plurality of ultrasonic sensors, which are distributed over the motor vehicle. In particular, they are implemented behind a particular wheel. In particular, since the critical region for driving over objects is behind the wheels, it is advantageous to carry out appropriate monitoring in this region. This allows the ultrasonic sensors to perform better monitoring of the underbody region. The arrangement of the ultrasonic sensors in this case can also be realized on additional components of the motor vehicle, for example in the region of the fender. In particular, the ultrasonic sensors are then oriented directly from the underbody in the direction of the road surface.

It is also advantageous if the ultrasonic sensor device has a plurality of ultrasonic sensors on the motor vehicle, the underbody region of the motor vehicle being monitored by means of the plurality of ultrasonic sensors. This allows the ultrasonic sensors to perform better monitoring of the underbody region. The arrangement in this case can also be realized on different components of the motor vehicle, for example in the region of the fender. In particular, the ultrasonic sensors are then oriented directly from the underbody in the direction of the road surface.

It is further advantageous if a respective reference measurement curve and/or a respective comparison measurement curve of an ultrasonic sensor of the plurality of ultrasonic sensors is compared with at least one respective reference measurement curve and/or a respective comparison measurement curve of a further ultrasonic sensor of the plurality of ultrasonic sensors, and verified. If, for example, the ultrasonic sensor were covered by an object during the generation of the measurement curves, the height change detection can still be carried out on the basis of the additional ultrasonic sensors. In particular, a verification of the evaluation of the ultrasonic sensor can then be carried out in turn. Thus, for example, if the plurality of ultrasonic sensors detect an appropriate clearance below the motor vehicle but another ultrasonic sensor does not detect any clearance, this can be verified and, for example, corresponding countermeasures can be initiated, such as the generation of a warning message for a user of the motor vehicle. This allows reliable monitoring of the underbody region to be implemented.

According to a further advantageous form of embodiment, objects in the measurement region that have been driven over during the generation of the reference measurement curve are taken into account during the monitoring. If, for example, objects such as pieces of wood or stones are present within the underbody region during the generation of the reference measurement curve and are also driven over, these can be additionally stored in the reference measurement curve as objects able to be driven over and can also be taken into account in monitoring the underbody region when the motor vehicle is driven off. Thus, extensive monitoring of the underbody region can be implemented.

Furthermore, it has proved to be advantageous if a measurement region is determined in the reference measurement curve, wherein a weighting for sample values in the measurement region is increased compared to samples outside the measurement region.

In particular, an adaptive weighting of the sample values in the evaluation of the measuring signals is therefore proposed for the underbody region monitoring in order to enable reliable object detection. A challenge in object detection is posed by the different distances between the objects and the ground, but also the different reflection behavior of objects. For example, soft objects in the ultrasound signal are more likely to "swallow" echoes, while hard objects generate new reflection peaks. With the aid of an appropriate weighting, this effect can be better handled and thus the object detection can be significantly improved.

According to a further advantageous form of embodiment, a ground reflection region and a decay time of the ultrasonic sensor are determined in the reference measurement curve, wherein a weighting for sample values in the ground reflection region is increased compared to sample values within the decay time. In particular, since the ultrasonic sensor is essentially deaf during the decay time, there is little information relating to monitoring the underbody region present there. On the other hand, potential information is present in the region of the ground reflection, so that the weighting is increased in the region of the determined ground reflection region. This allows an improved evaluation and monitoring of the underbody region.

It has also proved to be advantageous if a non-linear weighting is carried out over the decay time, the measurement region and the ground reflection region for monitoring the underbody region. In particular, information on an object from the decay time but also in particular from the ground reflection region can be integrated into the object detection and the sample values can be weighted throughout the evaluation range. The entire evaluation range is defined in particular from the decay time through the measurement region up to the ground reflection region. In particular, the influence of each region for object detection is now taken into account. In the decay time, hardly any information about an object is found, but in the region between the decay time and the ground reflection, in other words, in the measurement region, the majority of information is found, and in the ground reflection region itself there is in turn significantly less information. Depending on where the object is located, for example very close to the sensor or to the decay time, or very close to the ground reflection, the object information can be distributed differently. For this reason, an adaptive choice of weighting is proposed. For this purpose, both the decay time and ground reflection are measured during calibration, wherein in addition to the amplitude and position, the fluctuations of the corresponding peaks and/or their widths in the calibration period are of particular interest. When checking the underbody, in addition to the decay time, the height of the ground reflection can then also be examined.

Depending on the value of the features, a non-linear weighting of the sampling points can be applied, thus significantly increasing the sensitivity, but also the robustness of the object detection.

The method is in particular a so-called computer-implemented method.

A further aspect of the invention relates to a computer program product having program code means that are stored in a computer-readable storage medium in order to carry out the method for monitoring an underbody region according to the preceding aspect when the computer program product is executed on a processor of an electronic computing device.

Yet another aspect of the invention relates to a computer-readable storage medium having a computer program product according to the preceding aspect. The computer-readable storage medium can be designed in particular as part of an electronic computing device.

The electronic computing device comprises in particular circuits, for example integrated circuits, processors and other electronic components, which are necessary for processing the computer program product.

Another aspect of the invention relates to an ultrasonic sensor device for monitoring an underbody region of a motor vehicle, having at least one ultrasonic sensor and having an electronic computing device, the ultrasonic sensor device being designed to carry out a method according to the preceding aspect. In particular, the method is carried out by means of the ultrasonic sensor device.

Yet another aspect of the invention relates to a motor vehicle having an ultrasonic sensor device according to the preceding aspect. The motor vehicle can be in at least semi-autonomous, in particular fully autonomous, form.

Advantageous forms of embodiment of the method are to be seen as advantageous forms of embodiment of the ultrasonic sensor device as well as of the motor vehicle. The ultrasonic sensor device and the motor vehicle have concrete features for this purpose which enable the method or an advantageous form of embodiment thereof to be carried out.

Further features of the invention can be gathered from the claims, the figures and the description of the figures, The features and combinations of features that are cited in the description above and also the features and combinations of features that are cited in the description of the figures below and/or shown in the figures alone can be used not only in the respectively indicated combination but also in other combinations without departing from the scope of the invention. The invention is therefore also intended to be considered to comprise and disclose embodiments that are not explicitly shown and explained in the figures but that result and can be generated from the explained embodiments, by way of separate combinations of features. Embodiments and combinations of features that therefore do not have all the features of an originally formulated independent claim should also be regarded as disclosed. Embodiments and combinations of features that go beyond or differ from the combinations of features set out in the back-references of the claims should furthermore be considered to be disclosed, in particular by the embodiments set out above.

In the Drawings.

In the figures, identical or functionally identical elements are provided with the same reference signs.

Figure 1:
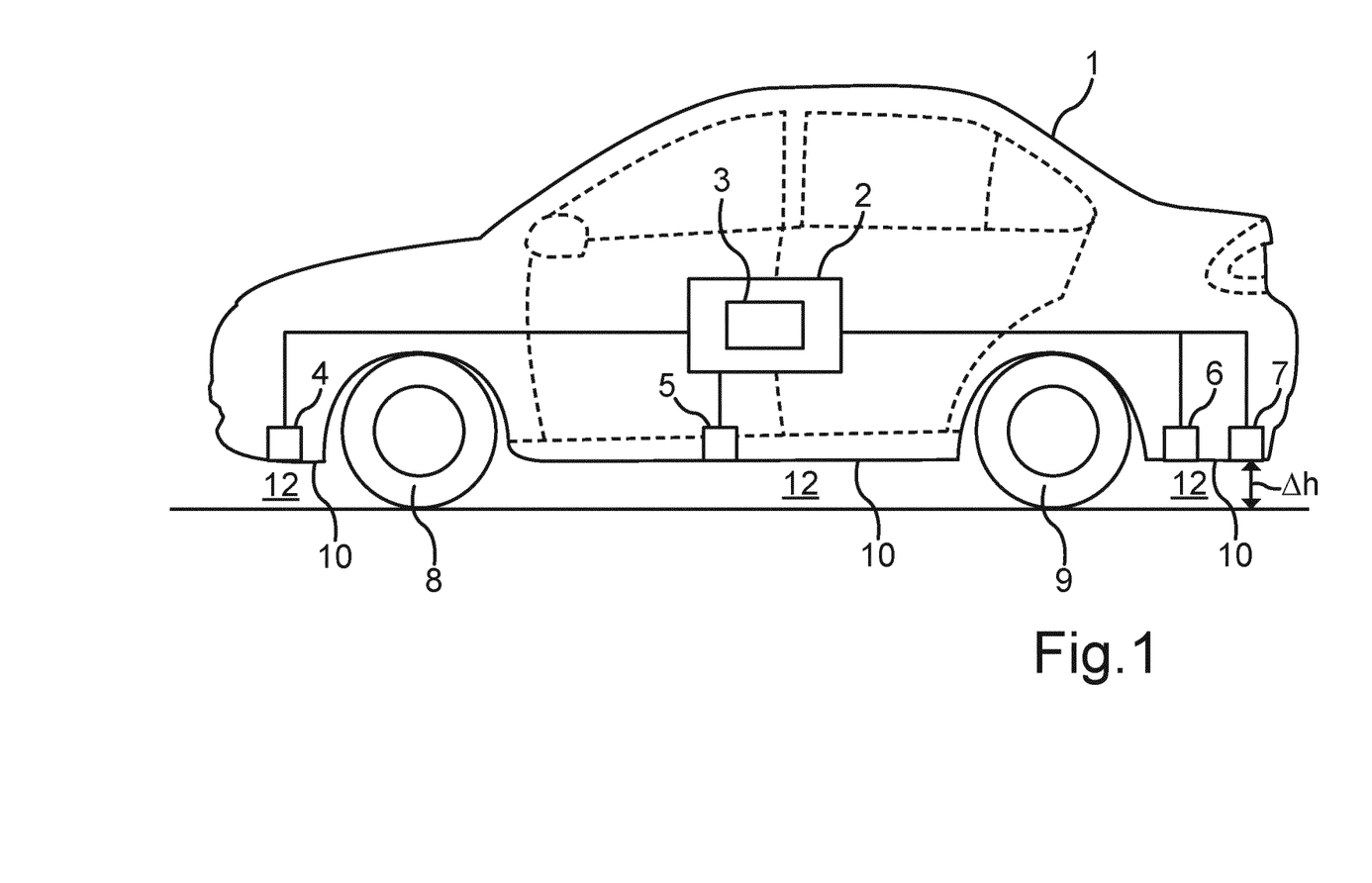
FIG. 1 shows a schematic side view of an embodiment of a motor vehicle with an embodiment of an ultrasonic sensor device.

FIG. 1 shows a schematic side view of an embodiment of a motor vehicle 1 with an embodiment of an ultrasonic sensor device 2. The ultrasonic sensor device 2 comprises in particular an electronic computing device 3 and at least one ultrasonic sensor 4, 5, 6, 7. In the following exemplary embodiment, the ultrasonic sensor device 2 comprises a first ultrasonic sensor 4, a second ultrasonic sensor 5, a third ultrasonic sensor 6, and a fourth ultrasonic sensor 7. The ultrasonic sensor device 2 can also have more than four ultrasonic sensors 4, 5, 6, 7. In the exemplary embodiment, this is purely exemplary and by no means to be regarded as exhaustive.

Furthermore, it is shown in FIG. 1 that the first ultrasonic sensor 4 can be arranged, for example, in a front region of the motor vehicle 1, for example on a fender of the motor vehicle 1. The second ultrasonic sensor 5 in the present case is located behind a front wheel 8. The third ultrasonic sensor 6 is arranged behind a rear wheel 9. The fourth ultrasonic sensor 7 is arranged on a rear of the motor vehicle 1, for example on a fender of the motor vehicle 1. The positioning of the different ultrasonic sensors 4, 5, 6, 7 is also to be understood in this case as purely exemplary. However, it is preferably provided that at least some of the ultrasonic sensors 4, 5, 6, 7 are arranged in front of and behind the corresponding wheels 8, 9, as these represent the critical regions for driving over objects. It is also practical for the ultrasonic sensors 4, 5, 6, 7 to be oriented directly from an underbody 10 of the motor vehicle 1 in the direction of a ground surface 11 on which the motor vehicle 1 is located. In particular, an underbody region 12 is formed between the underbody 10 and the ground surface 11.

In a method for monitoring the underbody region 12 of the motor vehicle 1, an ultrasonic signal U (FIG. 2) is emitted into the underbody region 12 by means of at least one ultrasonic sensor 4, 5, 6, 7 of the ultrasonic sensor device 2, and the reflected ultrasonic signals U are received and analyzed by means of the at least one ultrasonic sensor 4, 5, 6, 7, wherein after the motor vehicle 1 is parked at a first point in time $t_1$ (FIG. 2), a reference measurement curve 13 (FIG. 2) for the underbody region 12 is generated as a function of at least one ultrasonic signal U and stored. A measurement region 18 (FIG. 2) is determined in the reference measurement curve 13, in which region the monitoring process of the underbody region 12 is evaluated, wherein the measurement region 18 is determined on the basis of a decay time 16 (FIG. 2) of the ultrasonic sensor 4, 5, 6, 7 and a ground reflection 19 (FIG. 2) on the ground surface 11.

In addition, after a restart of the motor vehicle 1, at a second point in time $t_2$ (FIG. 3) later than a first point in time $t_1$, a comparison measurement curve 14 (FIG. 3) can be generated as a function of at least one further ultrasonic signal U, and the reference measurement curve 13 is compared with the comparison measurement curve 14 and, based on the comparison, the monitoring of the underbody region 12 is carried out by means of the electronic computing device 3.

Figure 3:
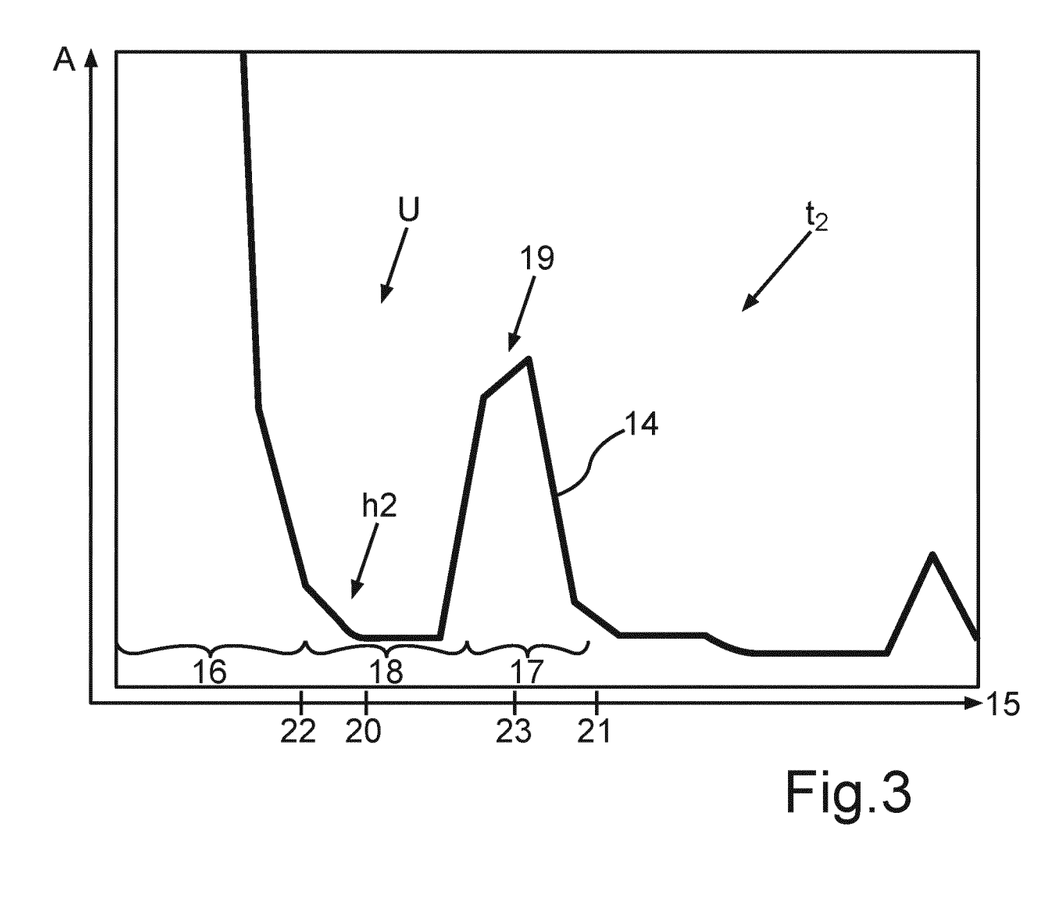
FIG. 3 shows a schematic diagram of a comparison measurement curve.

It is also provided that, based on the comparison, a change in height $\Delta h$ between the underbody 10 of the motor vehicle 1 and the ground surface 11 in the underbody region 12 is determined, and the change in height $\Delta h$ is taken into account in the evaluation and monitoring, wherein the change in height $\Delta h$ between the first point in time $t_1$ and the second time $t_2$ is determined.

Figure 2:
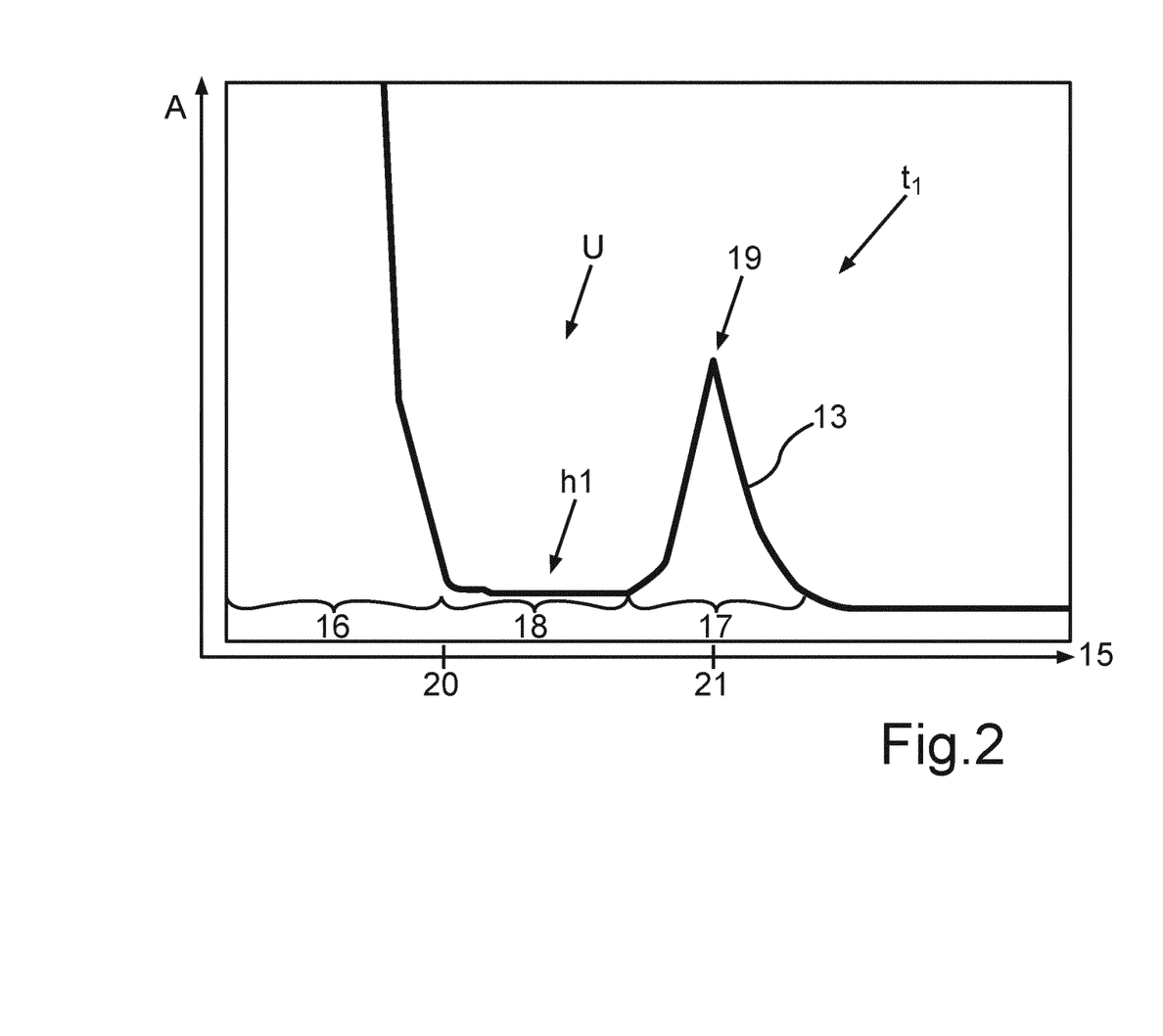
FIG. 2 shows a schematic diagram of a reference measurement curve.

FIG. 2 shows a schematic diagram of a reference measurement curve 13 that was generated at the first time point $t_1$. In particular, sample values 15 of the ultrasonic signals U are plotted on the abscissa. In particular, corresponding amplitudes of the ultrasonic signal U are shown on the ordinate. The reference measurement curve 13 includes the decay time 16, the ground reflection region 17, and the measurement region 18.

In particular, the ground reflection region 18 has a peak as the ground reflection 19, which represents, for example, the ground itself. On the basis of the measurement region 18, in particular, a first height h1 can be determined, the first height h1 between the underbody and the ground surface 11 being determined during the first point in time $t_1$. A second height h2 (FIG. 3) can be determined in particular during the second point in time $t_2$.

In particular, FIG. 2 shows a typical signal of an ultrasonic sensor 4, 5, 6, 7 when used in the underbody region 12 of the motor vehicle 1. In particular, two regions can be clearly identified. Firstly, the region of the decay time 16 at the start of the signal and, at a later time, a clear signal deflection. This signal deflection can in turn be attributed to the ground reflection 19. The interval between the two features of the signals thus determines the region to be evaluated, in particular the measurement region 18, for object detection in the underbody region 12.

In particular, the end of the decay time 16 is identified by the reference sign 20 in the sample values 15, and the peak for the ground reflection 19 is identified by the reference sign 21 in the sample values 15. This is the case here at the first point in time $t_1$.

FIG. 3 shows a schematic diagram of the comparison measurement curve 14 at the second point in time $t_2$. In comparison to the ultrasonic signal U according to FIG. 2, a difference in the decay time 16 is already apparent. In addition, it can be seen even more clearly that the shape, but also the distance to the ground reflection 19, is significantly different from FIG. 2. In particular, the end of the decay time 16 is identified by the reference sign 22 in the sample values 15, and the peak for the ground reflection 19 is identified by the reference sign 23 in the sample values 15. This is shown here at the second point in time $t_2$. For illustration purposes, the reference signs 20 and 21 according to FIG. 2 are also shown.

If the same evaluation or the same evaluation regions or measurement regions 18 as in FIG. 2 were to be used, this would give rise to errors in the determination and thus also false detections or failure to detect objects.

It is therefore proposed, in particular, that in the reflected ultrasonic signal U of the reference measurement curve 13, the ground reflection 19 of the ground surface 11 is determined and the first height h1 relative to the ground surface 11 is determined on the basis of the ground reflection 19 determined at the first point in time $t_1$, and in the further reflected ultrasonic signal U of the comparison measurement curve 14 the ground reflection 19 of the ground surface 11 is determined and the second height h2 relative to the ground surface 11 is determined on the basis of the determined ground reflection 19 at the second point in time $t_2$, and by comparing the first height h1 and the second height h2, the change in height Δh is determined.

As already mentioned, the decay time 16 of the ultrasonic sensor 4, 5, 6, 7 is taken into account when determining the change in height Δh. It can be further provided, in particular, that at least one first environmental condition is detected when generating the reference measurement curve 13 and/or at least one second environmental condition is detected when generating the comparison measurement curve 14 and the first environmental condition and/or the second environmental condition are taken into account when determining the change in height Δh. For example, the environmental conditions may be temperatures or air humidity values. It can be further provided that a respective reference measurement curve 13 and/or a respective comparison measurement curve 14 of an ultrasonic sensor 4, 5, 6, 7 of the plurality of ultrasonic sensors 4, 5, 6, 7 is compared with at least one respective reference measurement curve 13 and/or with a respective comparison measurement curve 14 of a further ultrasonic sensor 4, 5, 6, 7 of the plurality of ultrasonic sensors 4, 5, 6, 7 and verified. In particular, objects able to be driven over can also be taken into account when generating the reference measurement curve 13.

Figure 4:
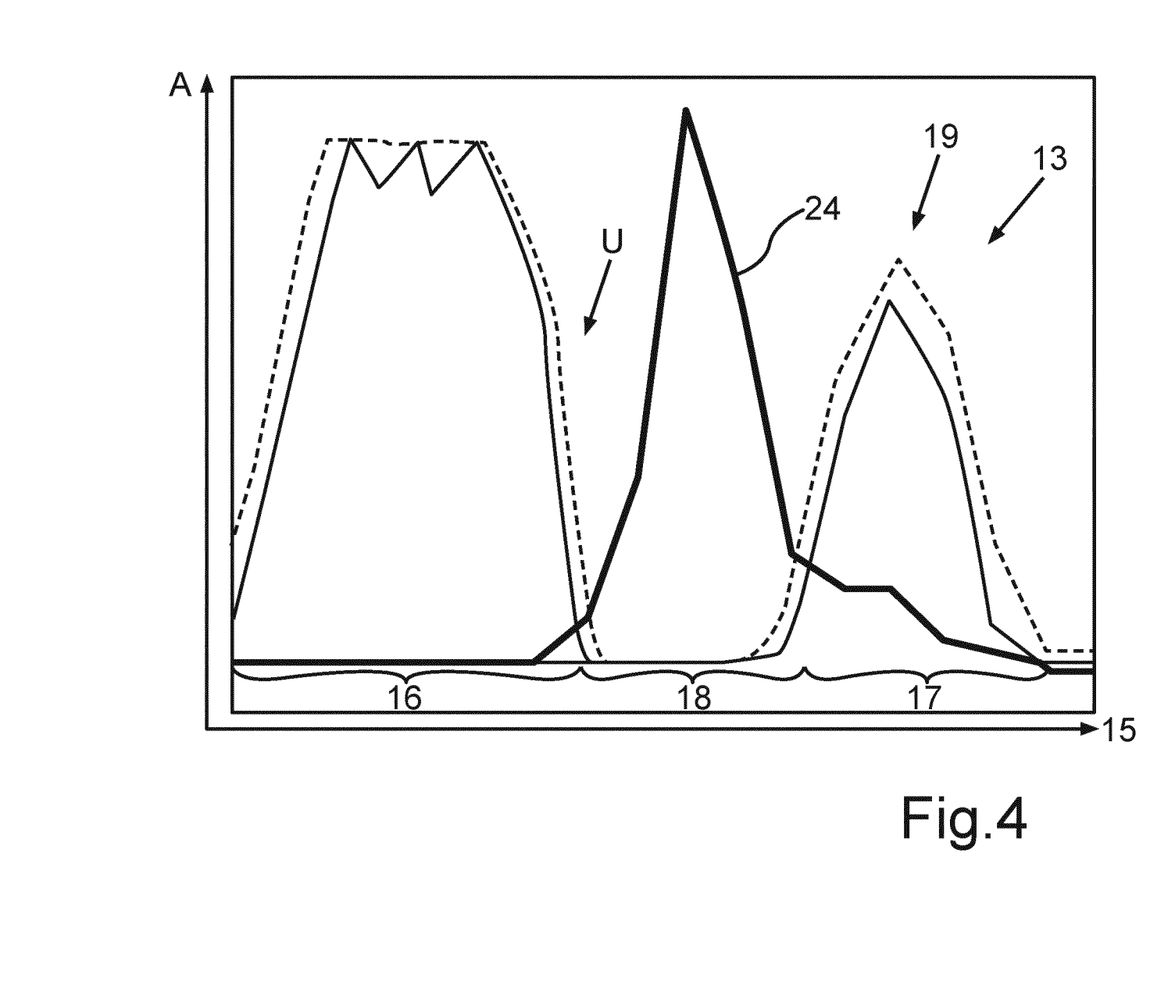
FIG. 4 shows a further schematic diagram of a plurality of reference measurement curves.

FIG. 4 shows another schematic diagram, in particular of a plurality of different reference measurement curves 13. In particular, it is shown that a plurality of different decay times 16 for the reference measurement curve 13 is acquired. In addition, a plurality of ground reflection regions 17 can be determined.

In particular, FIG. 4 shows that monitoring of the underbody region 12 is only carried out in a very limited section of the signal, since, for example, only 20 cm is typically available between the ultrasonic sensor 4, 5, 6, 7 and the ground surface 11. This region is additionally restricted by the decay time 16 and the ground reflection region 17. While little information about an object is usually available in the decay time 16, an exception occurs in that when an object is touching the ultrasonic sensor 4, 5, 6, 7 or is only a few centimeters away from it, reflections from the object can also be contained in the ground reflection region 17. Since the reflection amplitude of ground reflections 19 can be significantly higher than objects at risk, a corresponding method is proposed. In order to integrate the information on the object from the decay time 16, but in particular from the ground reflection 19, into the object detection, a weighting of 24 of the sample values 15 in the entire evaluation region is recommended. The evaluation region is defined in particular by the decay time 16, the measurement region 18, and the ground reflection region 17. The influence of the respective region for object detection is taken into account.

As already described, there is typically hardly any information about an object during the decay time 16. In the region between the decay time 16 and the ground reflection 19, however, the majority of information is found, and in the ground reflection 19 itself again significantly less. Depending on where the object is located, the object information can be distributed differently. For this reason, the adaptive choice of weighting 24 is proposed. For this purpose, the decay time 16 and the ground reflection 19 are measured during the generation of the reference measurement curve 13. In addition to the amplitude and position, the fluctuations of the corresponding peaks with their widths are also of interest during the calibration period. When examining the underbody region 12, the decay time 16 can again be examined, but also the height of the ground reflection 19.

Depending on the value of the features, a non-linear weighting of 24 of the sample points 15 can be performed and thus the sensitivity, but also the robustness of the objects, can be significantly increased. The adaptive weighting 24 of the sample values 15 in the evaluation of the corresponding measuring signals for the underbody monitoring is advantageous in order to make reliable object detection possible at all. The challenges posed in the object detection are the different distances between the objects and the ground, surface 11, but also the different reflection behavior of objects. With the aid of the adaptive weighting 24 these effects can be better handled and the object detection thereby significantly improved.

FIG. 4 shows in particular a set of curves for the reference measurement curves 13. In addition, the weighting 24 of the sample values 15 is applied. This weighting 24 was determined as a function of the corresponding set of curves. It is clearly shown that the measurement region 18 is the most critical for object detection in the underbody region 12 and it is located precisely between the decay time 16 and the ground reflection 19. In addition, it can also be provided here that the decay time 16 is weighted significantly lower than the ground reflection 19, which at least in some cases is input into the evaluation with an even higher weight. In particular, the weighting 24 in the measurement region 18 is thus significantly higher than in the decay time 16 and the ground reflection region 17.

In particular, it can be provided that the weighting 24 is adapted to match the corresponding conditions during the generation of the reference measurement curve 13 and thus represents a precisely matched function for the respective environmental scenario. With the adaptive weighting 24, the object recognition can therefore be improved overall, among other things by allowing the evaluation to be matched significantly better to the conditions.

FIG. 4 thus shows in particular that a measurement region 18 is determined in the comparison measurement curve 14, wherein the weighting 24 for the sample values 15 in the measurement region 18 is increased compared to the sample values 15 outside the measurement region 18. In particular, the ground reflection region 17 and the decay time 16 of the ultrasonic sensor 4, 5, 6, 7 can be determined in the reference measurement curve 13, wherein the weighting 24 for the sample values 15 in the ground reflection region 17 is increased compared to sample values 15 within the decay time 16. In order to monitor the underbody region 12, in particular, as shown by the weighting 24, a non-linear weighting 24 can be applied over the decay time 16, the measurement region 18 and the ground reflection region 17.

The invention also relates to an unillustrated computer program product and an unillustrated computer-readable storage medium.

The invention claimed is:
1. A method for operating an ultrasonic sensor device for monitoring an underbody region of a motor vehicle by the ultrasonic sensor device, the method comprising:
  emitting ultrasonic signals into the underbody region by at least one ultrasonic sensor of the ultrasonic sensor device;
  receiving and evaluating the reflected ultrasonic signals by the at least one ultrasonic sensor,
  wherein after the motor vehicle is parked at a first point in time, a reference measurement curve for the underbody region is generated as a function of at least one ultrasonic signal and stored; and determining a measurement region in the reference measurement curve, in which region the monitoring process of the underbody region is evaluated, wherein the measurement region is determined on the basis of a decay time of the ultrasonic sensor and a ground reflection on the ground surface, wherein after a restart of the motor vehicle, at a second point in time later than the first point in time, a comparison measurement curve is generated as a function of at least one further ultrasonic signal and the reference measurement curve is compared with the comparison measurement curve in the measurement region, and based on the comparison:
- the monitoring of the underbody region is carried out by an electronic computing device of the ultrasonic sensor device, and
- a change in height between an underbody of the motor vehicle and a ground surface in the underbody region is determined, wherein the change in height is taken into account in the evaluation and monitoring, wherein the change in height between the first point in time and the second time is determined.

2. The method as claimed in claim 1, wherein in the reflected ultrasonic signal of the reference measurement curve, a ground reflection of the ground surface is determined and a first height relative to the ground surface is determined on the basis of the determined ground reflection at the first point in time, and in the further reflected ultrasonic signal of the comparison measurement curve a ground reflection of the ground surface is determined and a second height relative to the ground surface is determined on the basis of the determined ground reflection at the second point in time, and by comparing the first height and the second height, the change in height is determined.

3. The method as claimed in claim 1, wherein a decay time of the ultrasonic sensor is taken into account when determining the change in height.

4. The method as claimed in claim 1, wherein at least one first environmental condition is detected when generating the reference measurement curve and at least one second environmental condition is detected when generating the comparison measurement curve and the first environmental condition and the second environmental condition are taken into account when determining the change in height.

5. The method as claimed in claim 1, wherein the ultrasonic signal is emitted by the at least one ultrasonic sensor in a region behind a wheel of the motor vehicle.

6. The method as claimed in claim 1, wherein the ultrasonic sensor device has a plurality of ultrasonic sensors on the motor vehicle, wherein the underbody region of the motor vehicle is monitored by the plurality of ultrasonic sensors.

7. The method as claimed in claim 6, wherein a respective reference measurement curve and/or a respective comparison measurement curve of an ultrasonic sensor of the plurality of ultrasonic sensors is compared with at least one respective reference measurement curve and/or a respective comparison measurement curve of a further ultrasonic sensor of the plurality of ultrasonic sensors and verified.

8. The method as claimed in claim 1, wherein objects in the measurement region that have been driven over during the generation of the reference measurement curve are taken into account during monitoring.

9. The method as claimed in claim 1, wherein a weighting for sample values in the measurement region is increased compared to samples outside the measurement region.

10. The method as claimed in claim 1, wherein a ground reflection region and a decay time of the ultrasonic sensor are determined in the reference measurement curve, wherein a weighting for sample values in the ground reflection region is increased compared to sample values within the decay time.

11. The method as claimed in claim 9, wherein to monitor the underbody region, a non-linear weighting is carried out over the decay time, the measurement region and the ground reflection region.

12. A computer program product having program code means that are stored in a non-transitory computer-readable storage medium in order to carry out the method as claimed in claim 1, when the computer program product is executed on a processor of an electronic computing device.

13. A non-transitory computer-readable storage medium having a computer program product as claimed in claim 12.

14. An ultrasonic sensor device for monitoring an underbody region of a motor vehicle, comprising:
- at least one first ultrasonic sensor; and
- an electronic computing device,
- the at least one ultrasonic sensor device being configured to carry out a method as claimed claim 1.

* * * * *